(12) United States Patent
Haberstock et al.

(10) Patent No.: US 11,421,714 B2
(45) Date of Patent: Aug. 23, 2022

(54) HYDRAULIC CONTROL UNIT FOR AN AUTOMATIC TRANSMISSION OF A MOTOR VEHICLE

(71) Applicant: ZF Friedrichshafen AG, Friedrichshafen (DE)

(72) Inventors: Alexander Haberstock, Ravensburg (DE); Thilo Schmidt, Meckenbeuren (DE); Armin Haugg, Friedrichshafen (DE); Christian Schupp, Wolfegg (DE); Markus Herrmann, Scheidegg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 167 days.

(21) Appl. No.: 16/835,564

(22) Filed: Mar. 31, 2020

(65) Prior Publication Data
US 2020/0309159 A1  Oct. 1, 2020

(30) Foreign Application Priority Data

Apr. 1, 2019  (DE) .................... 10 2019 204 532.4

(51) Int. Cl.
*F15B 9/14* (2006.01)
*F16H 61/00* (2006.01)
(52) U.S. Cl.
CPC ........... *F15B 9/14* (2013.01); *F16H 61/0021* (2013.01)
(58) Field of Classification Search
IPC ............. F16B 9/14; F16H 61/0021,2061/0279, 61/14, 61/50
See application file for complete search history.

(56) References Cited

U.S. PATENT DOCUMENTS

| 2,859,762 | A | * | 11/1958 | Banker | .................... | B62D 5/07 |
| | | | | | | 137/101 |
| 3,307,568 | A | * | 3/1967 | Gartner | ................ | G05D 16/101 |
| | | | | | | 137/115.26 |
| 3,332,436 | A | * | 7/1967 | Welty | .................... | G05D 23/08 |
| | | | | | | 137/468 |
| 3,920,035 | A | | 11/1975 | Werner | | |
| 2014/0373523 | A1 | | 12/2014 | Brown et al. | | |

FOREIGN PATENT DOCUMENTS

| DE | 2323550 A | 11/1974 |
| DE | 4200910 A1 | 7/1993 |
| DE | 4420959 A1 | 1/1995 |
| DE | 102013211621 A1 | 12/2014 |
| EP | 0017662 A1 | 10/1980 |

OTHER PUBLICATIONS

German Search Report DE102019204532.4, dated Nov. 22, 2019. (12 pages).

* cited by examiner

*Primary Examiner* — Colby M Hansen
(74) *Attorney, Agent, or Firm* — Dority & Manning, P.A.

(57) ABSTRACT

A hydraulic control unit (4) for an automatic transmission of a motor vehicle includes a volumetric flow rate control valve (49). The hydraulic control unit (4) is configured for delivering hydraulic fluid to an inlet (59) of the volumetric flow rate control valve (49). An outlet (31, 71) of the volumetric flow rate control valve (18, 49) is connected to a torque converter torus of the automatic transmission. In addition, the volumetric flow rate control valve (59) is configured for directing the hydraulic fluid across an orifice (66), so that the pressure of the hydraulic fluid is reduced and a constant flow of hydraulic fluid is feedable to a torque converter torus.

13 Claims, 6 Drawing Sheets

HYDRAULIC CONTROL UNIT FOR AN AUTOMATIC TRANSMISSION OF A MOTOR VEHICLE

CROSS-REFERENCE TO RELATED APPLICATION

The present application is related and has right of priority to German Patent Application No. 10 2019 204 532.4 filed on Apr. 1, 2019, which is incorporated by reference in its entirety for all purposes.

FIELD OF THE INVENTION

The invention relates generally to a hydraulic control unit for an automatic transmission of a motor vehicle. The invention also relates generally to an automatic transmission that includes the hydraulic control unit as well as to a motor vehicle that includes the automatic transmission.

BACKGROUND

In order to configure the starting process to be comfortable for occupants of a motor vehicle, a torque converter is typically utilized in automatic transmissions of motor vehicles. The torque converter includes, on the one hand, an impeller, a turbine wheel, and a stator, which, together, are referred to as a "torque converter torus" or "torus". In addition, the torque converter usually includes a torque converter lock-up clutch, which reduces the slip between the impeller and the turbine wheel. During starting processes, the torque converter lock-up clutch is disengaged. After the starting process, the torque converter lock-up clutch is engaged. The torque converter can be, in particular, a "3-line torque converter", which is characterized by the fact that the 3-line torque converter includes a separate "to the torus" oil line, a separate "from the torus" oil line, and a separate "to the torque converter lock-up clutch" oil line.

Moreover, the automatic transmission includes a hydraulic control unit. Typically, the hydraulic control unit includes multiple oil circuits, which are supplied according to priority. A primary system pressure circuit (priority 1) supplies the pressure regulators and clutch valves for transmitting the engine torque, and the torque converter lock-up clutch. A secondary system pressure circuit (priority 2) supplies the cooling and the lubrication of the automatic transmission. A tertiary system pressure circuit returns the excess amount to the pump suction side. Typically, the hydraulic control unit includes a converter clutch valve. When the torque converter lock-up clutch is engaged, a pressure—with which the torque converter lock-up clutch is supplied—can be variably set via the converter clutch valve. As a result, the pressure can be adapted to a torque to be transmitted.

The converter clutch valve is supplied with oil from the primary system pressure circuit. Depending on the pressure at the torque converter lock-up clutch, a certain through-flow of the torus sets in via a torus orifice in the "to the torus" oil line, which increases the primary demand in the case of high pressures at the torque converter lock-up clutch. A low-end valve in the "from the torus" oil line sets a constant pressure on the "from the torus" side (for example, one (1) bar) when the torque converter lock-up clutch is engaged. The pressure in the torus then represents the back pressure to the pressure at the torque converter lock-up clutch. As a result, a torque can be transmitted via the torque converter lock-up clutch only when the pressure at the torque converter lock-up clutch is higher than the pressure set with the aid of the low-end valve. Pressure peaks or pressure drops in the torus can affect the power transmission capacity of the torque converter lock-up clutch.

The flow rate at the torus is therefore dependent on the pressure at the torque converter lock-up clutch and on the diameter of the torus orifice. The flow rate can be, for example, up to four and a half (4.5) liters per minute. The flow is necessary in order to cool the torque converter lock-up clutch, which is typically situated on the outer side of the torus. As a result, however, the oil demand from the primary system pressure circuit also increases. In order to be able to make enough oil available to the system in the case of high pressures at the torque converter lock-up clutch, the oil pump is designed to be correspondingly large. In order to keep the fuel consumption low, the objective, however, is to keep the oil pump as small as possible.

SUMMARY OF THE INVENTION

Example aspects of the present invention reduce the flow through the torus while ensuring the full functionality (disengagement and engagement) and the sufficient cooling of the torque converter lock-up clutch.

According to example aspects of the present invention, it is provided to make a volumetric flow rate control valve (which can also be referred to as a "torus volumetric flow rate control valve") available, instead of the torus orifice. This volumetric flow rate control valve is configured for setting a constant flow, in that a defined pressure differential is controlled, by a closed-loop system, at an orifice. The flow rate that is to flow can be determined via the orifice diameter. An advantage of the volumetric flow rate control valve is that a constant flow is set, regardless of the inlet pressure and the outlet pressure. There only needs to be, at the least, the pressure differential between the inlet and the outlet. If the flow resistances in the lines increase and the torus pressure increases via the low end, for example when it is cold, the volumetric flow rate control valve can respond thereto and nevertheless set the desired through-flow.

In this sense, according to a first example aspect of the invention, a hydraulic control unit for an automatic transmission of a motor vehicle is made available. The hydraulic control unit includes a volumetric flow rate control valve. The hydraulic control unit is configured for delivering hydraulic fluid to an inlet of the volumetric flow rate control valve. An outlet of the volumetric flow rate control valve is connected, in particular directly, to a torque converter torus of the automatic transmission. In addition, the volumetric flow rate control valve is configured for directing hydraulic fluid, which has been supplied to the volumetric flow rate control valve, across an orifice, so that the pressure of the hydraulic fluid is reduced and so that a constant flow, in particular of the hydraulic fluid that has flowed through the orifice, can be fed to the torque converter torus.

An "orifice" can be understood to be a local flow resistance. At the orifice, the line cross-section abruptly tapers. In the area of the orifice, a quotient or ratio of a length of the flow cross-section in the orifice and a line diameter in the orifice can be relatively small, for example smaller than one and a half (1.5). Hydraulic fluid is backed up ahead of the orifice, so that an inlet pressure upstream of the orifice is higher than an outlet pressure downstream of the orifice. In other words, a pressure differential arises at the orifice. A flow rate of hydraulic fluid (in particular oil), which flows through the orifice, can be substantially influenced by the flow cross-section, a through-flow coefficient of the orifice, a density of the hydraulic fluid, and the above-described pressure differential. For example, an, in particular, constant flow can be set via a suitable selection of the flow cross-section of the orifice; the flow flows across the orifice when a certain/defined pressure differential arises at the orifice. Due to the orifice, therefore, a constant flow can be set with the aid of the volumetric flow rate control valve. This can take place regardless of the input pressure and the output pressure if the pressure differential exceeds a certain value.

In one example embodiment, the orifice is arranged downstream from the outlet of the volumetric flow rate control valve. Alternatively, the orifice can also be arranged within the volumetric flow rate control valve.

A further example core of the invention is that of limiting the flow that flows through the torus by implementing the volumetric flow rate control valve (constant through-flow regardless of the torus pressure) as an insert part in the hydraulic control unit. This results in a reduction in size of the mechanical (or electrical) main pump (less primary demand in critical driving situations) without deteriorating the shift quality.

Due to the low flow rate, the volumetric flow rate control valve can be designed to be so small that a valve slide position in the hydraulic control unit does not need to be occupied. In this sense, the hydraulic control unit can include a housing part with a recess, wherein the volumetric flow rate control valve is inserted into the recess. In other words, the volumetric flow rate control valve can be designed as an "insert part". The housing part can be, in particular, a duct plate of the hydraulic control unit. A "duct plate" is understood to be an element of the hydraulic control unit, which includes multiple ducts for conducting hydraulic fluid, in particular oil. The duct plate can be, for example, a casting. The volumetric flow rate control valve can be retained from above via an intermediate plate. This saves costs (as compared to a slide valve), due to the fact that the production complexity (no bore machining necessary) and the unit costs (smaller component) can be reduced.

The volumetric flow rate control valve includes, in particular, a valve bush and a valve slide, which is guided in the longitudinal direction within the valve bush. A valve cover can also be provided, which at least partially closes the valve bush at a face end. Moreover, the hydraulic control unit can include the aforementioned housing part, in particular the duct plate, which includes a recess matching the outer contour of the valve bush. In addition, the hydraulic control valve can include the intermediate plate (which was also mentioned above), which can partially cover the valve cover and form a counter support for the valve cover. Moreover, the hydraulic control unit includes a spring, arranged, in particular, within the valve bush, for preloading the valve slide in a starting position.

According to the example embodiment of the volumetric flow rate control valve as an insert part, the valve bush is inserted, together with the valve cover, the valve slide, and the spring, into the recess of the housing part, in particular of the duct plate, and forms the volumetric flow rate control valve. The valve bush can form the inlet for hydraulic fluid into the volumetric flow rate control valve, and the valve cover can form an outlet for hydraulic fluid from the volumetric flow rate control valve. In addition, the housing part can form a duct for feeding hydraulic fluid to the inlet in the valve bush, and the intermediate plate can optionally form a duct for discharging hydraulic fluid out of the outlet of the valve cover.

The mounting of the volumetric flow rate control valve in the recess of the housing part, in particular of the duct plate, can take place in such a way that no additional complexity arises in handling processes because a number of insert parts (for example, strainers, check valves; balls), which are located in the housing part, in particular in the duct plate, are usually located in hydraulic control units anyway. According to example aspects of the present invention, the hydraulic valve is designed in such a way that the hydraulic valve can be mounted and/or inserted into the housing part of the hydraulic control unit in the simplest way during assembly, in particular without the need for complex centering or hold-down devices.

The hydraulic control unit can include an intermediate plate in addition to the duct plate. When the automatic transmission including the hydraulic control unit is installed in a motor vehicle, the intermediate plate is typically located above the duct plate and above an upper face end of the volumetric flow rate control valve. The features "upper" and "lower" and "above" and "below" utilized in the following relate to this installation situation of the intermediate plate and the duct plate within the hydraulic control unit. When the volumetric flow rate control valve, as an insert part, has been inserted into the recess of the duct plate, the intermediate plate can rest on the duct plate, above the duct plate, and can be attached to the duct plate. In particular, the intermediate plate closes the recess of the duct plate entirely or partially, so that the volumetric flow rate control valve inserted into the recess is held in the recess from above. The inlet of the volumetric flow rate control valve can be arranged laterally on the valve bush. "Laterally" is intended to mean, in particular, an area located on an outer surface of the valve bush, i.e., not at the face ends (upper and lower) of the volumetric flow rate control valve.

In one example embodiment, the intermediate plate and the housing part, in particular the duct plate, form a feed duct. Via the feed duct, hydraulic fluid is feedable to the inlet of the volumetric flow rate control valve. The intermediate plate can also include an opening, via which hydraulic fluid is dischargable from the volumetric flow rate control valve. Therefore, hydraulic fluid is feedable, from above, to the inlet of the volumetric flow rate control valve, wherein the hydraulic fluid is also dischargeable upward out of the volumetric flow rate control valve and directable to the torus. Due to the feeding and discharge from above, an additional degree of freedom in the positioning is created.

In one further example embodiment, the hydraulic control unit also includes an intermediate plate above a face end of the volumetric flow rate control valve. The intermediate plate and the housing part, in particular the duct plate, form a feed duct, via which hydraulic fluid is feedable to the inlet of the volumetric flow rate control valve. The feeding of hydraulic fluid to the flow valve can therefore also take place from above. The discharge of hydraulic fluid from the volumetric flow rate control valve can take place downward, however. In this sense, the housing part, in particular the duct plate, can form a discharge duct, via which hydraulic fluid can be discharged downward out of the outlet of the volumetric flow rate control valve. The outlet of the volumetric flow rate control valve is arranged, in particular, at the lower face end of the volumetric flow rate control valve. The discharge duct is connected to the outlet of the volumetric flow rate control valve and extends downward in the duct plate.

In a further example embodiment, the feeding of hydraulic fluid to the volumetric flow rate control valve takes place from below and the discharge of the hydraulic fluid takes place upward. Due to the feeding from below, an additional degree of freedom in the positioning is created. In this sense, the housing part, in particular the duct plate, can form a feed duct, via which hydraulic fluid can be fed from below to the inlet of the volumetric flow rate control valve. The feed duct can approach the volumetric flow rate control valve from a lower face end of the volumetric flow rate control valve facing away from the intermediate plate and can be connected to the inlet arranged laterally on the volumetric flow rate control valve. In addition, the hydraulic control unit can include an intermediate plate above a face end of the volumetric flow rate control valve, wherein hydraulic fluid from the volumetric flow rate control valve is dischargeable via the intermediate plate.

The outlet of the volumetric flow rate control valve can be connected to a line, which leads to the torus of the torque converter of the automatic transmission. The inlet of the volumetric flow rate control valve is suppliable with pressurized hydraulic fluid in a different way. The hydraulic control unit can include a primary system pressure circuit and a converter clutch valve. An inlet of the converter clutch valve is connected to the primary system pressure circuit, and an outlet of the converter clutch valve is connected to the inlet of the volumetric flow rate control valve, so that hydraulic fluid from the primary system pressure circuit is feedable to the volumetric flow rate control valve via the converter clutch valve.

In addition, the hydraulic control unit in one example embodiment can be configured for feeding hydraulic fluid from the primary system pressure circuit to the inlet of the volumetric flow rate control valve and, in fact, in particular directly from the primary system pressure valve, bypassing a converter clutch valve. The primary system pressure circuit is supplied with pressurized hydraulic fluid, in particular, by a hydraulic pump. This embodiment makes it possible for a constant flow through the torus to arise. This through-flow is independent of the pressure in the torque converter lock-up clutch. This has the advantage that the torus is always supplied with oil and, therefore, during the adjustment of the torque converter lock-up clutch, flow discontinuity, which can be noticeable for occupants of the motor vehicle, does not occur. When the torque converter lock-up clutch is disengaged, this embodiment also makes it possible for the flow not to be limited by the volumetric flow rate control valve, since, at this operating point, a substantially greater amount of oil is necessary for dissipating heat from the torque converter torus.

In addition, the hydraulic control unit can include a secondary system pressure circuit. The hydraulic control unit is configured for feeding hydraulic fluid from the secondary system pressure circuit to the inlet of the volumetric flow rate control valve. In this example embodiment, the volumetric flow rate control valve is configured to supply the torus with pressurized hydraulic fluid via the secondary system pressure circuit when the torque converter lock-up clutch is engaged. As a result, this solves the problem that the flow through the torus depends on the system pressure and, at high pressures (=high flow rate in the torus), a back pressure forms in the torus, which can drop immediately if the secondary circuit is decoupled, for example, during a rapid charging of the clutch. A pressure drop in the torque converter torus and, therefore, an associated back pressure to the torque converter lock-up clutch can be avoided, which positively affects the shift quality. Due to the fact that the volumetric flow rate control valve can set a constant flow, which results in only a slight pressure increase in the torus, a pressure drop occurring upon the decoupling of the secondary circuit only slightly affects the power transmission capacity of the torque converter lock-up clutch and the noticeability in the vehicle. By connecting the volumetric flow rate control valve to the secondary system pressure circuit, the main pump can be reduced in size even further, since no oil volume from the primary system circuit is necessary for supplying the torus.

According to a second example aspect of the invention, an automatic transmission for a motor vehicle is provided, wherein the automatic transmission includes a hydraulic control unit according to the first example aspect of the invention.

According to a third example aspect of the invention, a motor vehicle is made available, which includes an automatic transmission according to the second example aspect of the invention.

BRIEF DESCRIPTION OF THE DRAWINGS

Exemplary embodiments of the invention are explained in greater detail in the following with reference to the diagrammatic drawing, wherein identical or similar elements are provided with the same reference numbers. Wherein.

DETAILED DESCRIPTION

Figure 1:
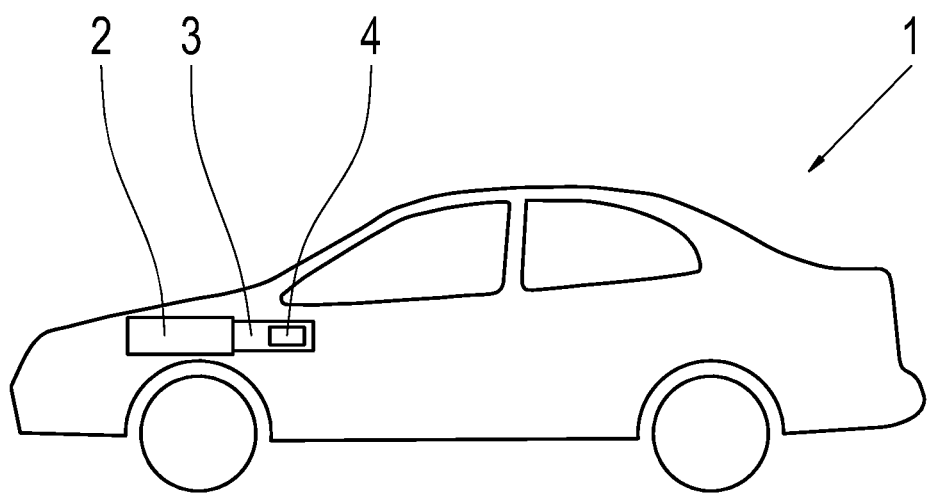
FIG. 1 shows a side view of a motor vehicle including an automatic transmission with a hydraulic control unit.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a motor vehicle 1. This is a passenger car in the example shown. The motor vehicle 1 includes a prime mover 2, for example, an internal combustion engine or an electric motor. The prime mover 2 drives the motor vehicle 1 with the aid of an automatic transmission 3. The automatic transmission 3 includes a hydraulic control unit 4.

Figure 2:
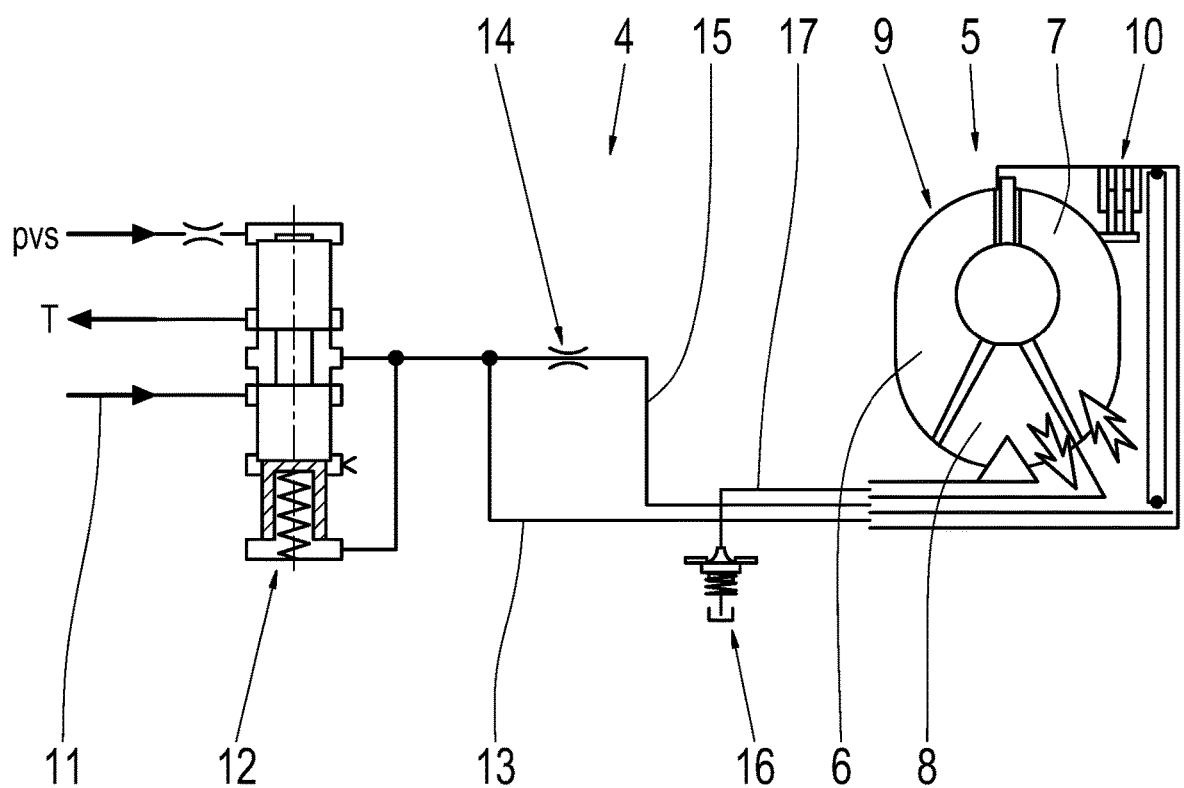
FIG. 2 shows a hydraulic circuit diagram of a part of a known hydraulic control unit including a 3-line torque converter, which is supplied with hydraulic fluid from a primary system pressure circuit of the hydraulic control unit via a converter clutch valve and via a torus orifice.

In order to configure the starting process to be comfortable for occupants of the motor vehicle 1, the automatic transmission 3 includes a hydrodynamic torque converter 5 shown in FIG. 2. The torque converter 5 includes an impeller 6, a turbine wheel 7, and a stator 8. The impeller 6, the turbine wheel 7, and the stator 8, together, are referred to as a "torque converter torus" or also simply as a "torus" 9. In addition, the torque converter 5 usually includes a torque converter lock-up clutch 10, which reduces the slip between the impeller 6 and the turbine wheel 7. The torque converter lock-up clutch 10 is disengaged during starting processes. After the starting process, the torque converter lock-up clutch 10 is engaged in order to reduce the slip and, in this way, to save energy. The torque converter 5 can be—as shown in FIG. 2—in particular, a so-called "3-line torque converter", which is characterized by the fact that the torque converter 5 includes a separate "to the torus" oil line, a separate "from the torus" oil line, and a separate "to the torque converter lock-up clutch" oil line.

The hydraulic control unit 4 includes a primary system pressure circuit 11, which supplies the pressure regulators and clutch valves for transmitting the engine torque, as well as the torque converter lock-up clutch 10. A secondary system pressure circuit (priority 2) not shown in FIG. 2 supplies the cooling and the lubrication of the automatic transmission 3. A tertiary system pressure circuit (also not shown in FIG. 2) returns the excess amount to a pump suction side.

The hydraulic control unit 4 includes a converter clutch valve 12. When the torque converter lock-up clutch 10 is engaged, a pressure can be variably set via the converter clutch valve 12, with which the torque converter lock-up clutch 10 is supplied via a first oil line 13, which extends from an outlet of the converter clutch valve 12 to the torque converter lock-up clutch 10. As a result, the pressure can be adapted to a torque to be transmitted.

The converter clutch valve 12 is a valve including multiple ports at a valve housing and including a valve slide with a piston. The valve slide can be displaced back and forth in the axial direction within the valve housing, in order, in this way, to connect certain ports to one another and disconnect them from one another. Converter clutch valves 12 are known from the prior art and, therefore, are not described in greater detail in the present application. The converter clutch valve 12 according to FIG. 2 is supplied with oil from the primary system pressure circuit 11 via a port (inlet). From the converter clutch valve 12, oil can drain, via a further port (outlet), depending on the position of the valve slide relative to the valve housing, in the direction of a tank T. A pilot pressure pvs can act, via a further port (inlet) of the valve housing, on a face end of the valve slide, in order to displace the valve slide, against a spring preload, into a position in which the primary system pressure circuit 11 is connected to the torque converter lock-up clutch 10 via the converter clutch valve 12 and the first oil line 13.

Depending on a pressure at the torque converter lock-up clutch 10, a certain flow through the torus 9 sets in, via a torus orifice 14 arranged downstream from the converter clutch valve 12, in a second oil line 15, which branches off from the first oil line 13 and extends to the torus 9. This through-flow increases the primary demand in the case of high pressures at the torque converter lock-up clutch 10. A low-end valve 16 designed as a non-return valve is arranged in a third oil line 17, which extends away from the torus 9. When the torque converter lock-up clutch 10 is engaged, the low-end valve 16 sets a constant pressure at the "from the torus" side (for example, one (1) bar). The pressure in the torus 9 then represents the back pressure to the pressure at the torque converter lock-up clutch 10. As a result, a torque can be transmitted via the torque converter lock-up clutch 10 only when the pressure at the torque converter lock-up clutch 10 is higher than the pressure set with the aid of the low-end valve 16. Pressure peaks or pressure drops in the torus 9 can considerably affect the power transmission capacity of the torque converter lock-up clutch 10.

The flow rate at the torus 9 is therefore dependent on the pressure at the torque converter lock-up clutch 10 and on the diameter of the torus orifice 9. The flow rate can be, for example, up to four and a half (4.5) liters per minute. The flow is necessary in order to cool the torque converter lock-up clutch 10, which is typically situated on the outer side of the torus 9. As a result, however, the oil demand from the primary system pressure circuit 11 also increases. In order to be able to make enough oil available to the system in the case of high pressures at the torque converter lock-up clutch 10, the oil pump, which supplies the system pressure circuits, is designed to be correspondingly large. In order to keep the fuel consumption low, the objective, however, is to keep the oil pump as small as possible.

Figure 3:
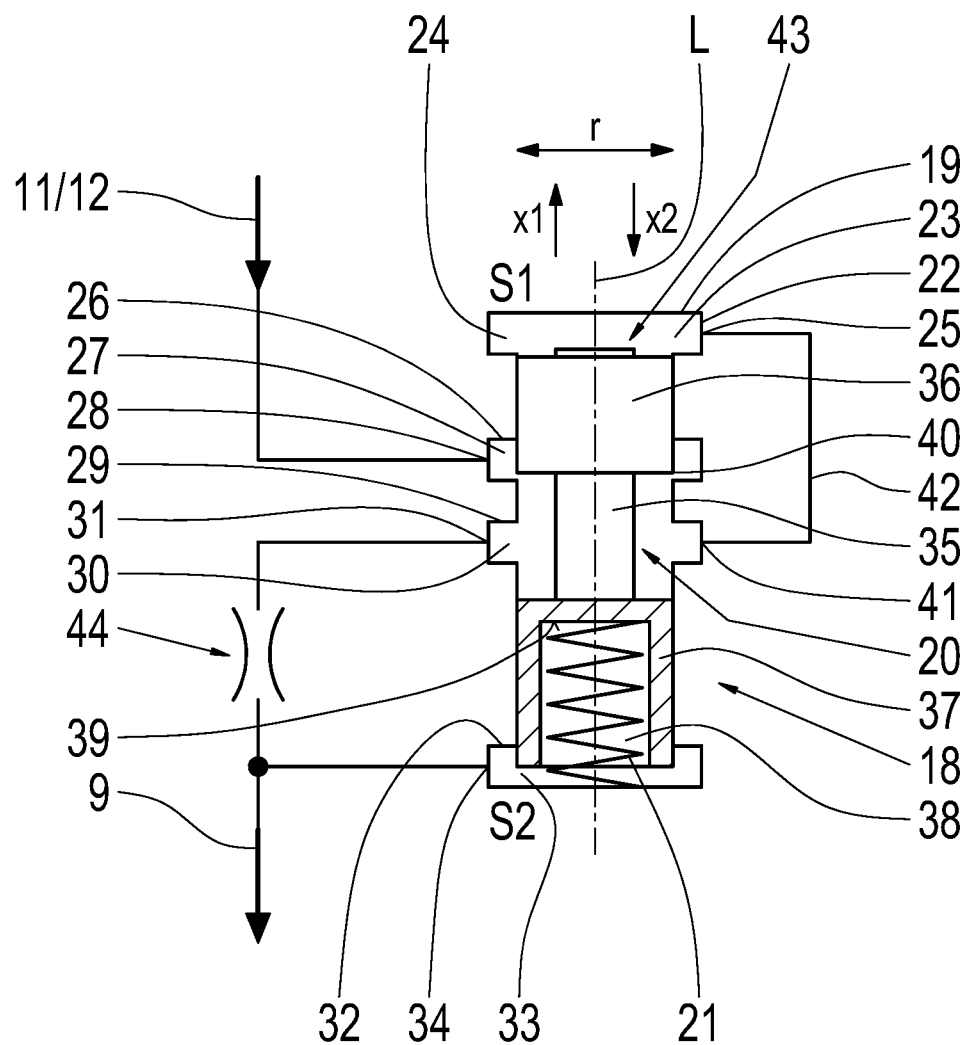
FIG. 3 shows a volumetric flow rate control valve, which, according to example aspects of the invention, replaces the torus orifice in the hydraulic control unit according to FIG. 2, wherein the volumetric flow rate control valve generates a constant flow with the aid of an external orifice.

FIG. 3 shows a volumetric flow rate control valve 18, which includes a valve housing 19 and a valve slide 20. The valve slide 20 is displaceable back and forth in opposite axial directions x1 (axial first direction) and x2 (axial second direction) within the valve housing 19 along a longitudinal axis L of the volumetric flow rate control valve 18. The valve slide 20 is pressed into a position shown in FIG. 3 with the aid of a spring element 21. The spring element 21 is arranged in the area of a second face end S2 (bottom, when the hydraulic control unit 4 is installed in the automatic transmission 3 according to FIG. 1) of the volumetric flow rate control valve 18.

In the area of a first face end S1 (top, when the hydraulic control unit 4 is installed in the automatic transmission 3 according to FIG. 1), which is located on a diametrically opposed side of the volumetric flow rate control valve 18, the volumetric flow rate control valve 18 includes a first valve collar 22. The first valve collar 22 can be formed by the valve housing 19. The first valve collar 22 is designed to be hollow inside and forms a first valve pocket 23, which extends, in a radial direction r of the volumetric flow rate control valve 18, further outward than an axial bore hole 24 of the valve housing 19 extending in the longitudinal direction L of the volumetric flow rate control valve 18. Moreover, the valve housing 19 includes a first port 25 in the area of the first valve pocket 23, which is connectable to the first valve pocket 23. The first port 25 can be utilized, in particular, as an inlet for oil, so that oil can fill the first valve pocket 23 and the axial bore hole 24.

The volumetric flow rate control valve 18 includes a second valve collar 26 arranged adjacent to the first valve collar 22 and at an axial distance from the first valve collar 22 in the second direction x2. The second valve collar 26 can be formed by the valve housing 19. The second valve collar 26 is designed to be hollow inside and forms a second valve pocket 27, which extends, in the radial direction r of the volumetric flow rate control valve 18, further outward than the axial bore hole 24 of the valve housing 19 extending in the longitudinal direction L of the volumetric flow rate control valve 18. Moreover, the valve housing 19 includes a second port 28 in the area of the second valve pocket 27, which is connectable to the second valve pocket 27. The second port 28 can be utilized, in particular, as an inlet for oil, so that oil can fill the second valve pocket 27 and the axial bore hole 24. The second port 28 is connectable to the outlet of the converter clutch valve 12, so that the volumetric flow rate control valve 18 is connected to the primary system pressure circuit 11 and is supplied, by way thereof, with pressurized oil. Alternatively, the second port 27 can also be directly connected to the primary system pressure circuit 11 or to the secondary system pressure circuit, bypassing the converter clutch valve 12.

The volumetric flow rate control valve 18 includes a third valve collar 29 arranged adjacent to the second valve collar 26 and at an axial distance from the second valve collar 13 in the second direction x2. The third valve collar 29 can be formed by the valve housing 19. The third valve collar 29 is designed to be hollow inside and forms a third valve pocket 30, which extends, in the radial direction r of the volumetric flow rate control valve 18, further outward than the axial bore hole 24 of the valve housing 19 extending in the longitudinal direction L of the volumetric flow rate control valve 18. Moreover, the valve housing 19 includes a third port 31 and a fourth port 41 in the area of the third valve pocket 30. The third port 31 and the fourth port 41 are connectable to the third valve pocket 30. The third port 31 and the fourth port 41 can be utilized, in particular, as an outlet for oil, so that oil can be discharged from the third valve pocket 30 and from the axial bore hole 24. The fourth port 41 is connected to the first port 25 via a connection line 42, so that oil emerging from the fourth port can be fed to the first port 25.

The volumetric flow rate control valve 18 includes a fourth valve collar 32 arranged adjacent to the third valve collar 29 and at an axial distance from the third valve collar 16 in the second direction x2. The fourth valve collar 32 can be formed by the valve housing 19. The fourth valve collar 32 is designed to be hollow inside and forms a fourth valve pocket 33, which extends, in the radial direction r of the volumetric flow rate control valve 18, further outward than the axial bore hole 24 of the valve housing 19 extending in the longitudinal direction L of the volumetric flow rate control valve 18. Moreover, the valve housing 19 includes a fifth port 34 in the area of the fourth valve pocket 33, which is connectable to the fourth valve pocket 33. The fifth port 34 can be utilized, in particular, as an outlet for oil, so that oil can be discharged from the fifth valve pocket 33 and from the axial bore hole 24.

The valve slide 20 includes a piston rod 35. A first piston 36 and a second piston 37 are arranged on the piston rod 35. The individual pistons 36 and 37 are connected, in particular fixedly, to the piston rod 35. The pistons 36 and 37 extend further outward than the piston rod 35 in the radial direction r of the valve slide 20. The diameters of the pistons 36 and 37 are selected in such a way that the pistons 36 and 37 are movable back and forth in the longitudinal direction L within the axial bore hole 24 of the valve housing 19 and, in particular, in a (largely) sealing and frictionless manner with respect to the valve bush 19. The valve pockets 23, 27, 30 and 33 extend further outward than the pistons 36 and 37 in the radial direction r of the valve slide 20. The first piston 36 is arranged in the area of the first face end S1. Moreover, the second piston 37 is arranged, in the area of the second face end S2, adjacent to the first piston 36 and at an axial distance from the first piston 36 in the second direction x2.

The first piston 36 seals off the first valve pocket 23 with respect to the second valve pocket 27 regardless of the position of the valve slide 20 in relation to the valve bush 19, so that there is no direct connection between the first valve pocket 23 and the second valve pocket 27. The second piston 37 seals off the third valve pocket 30 from the fourth valve pocket 33 in a similar way, regardless of the position of the valve slide 20 in relation to the valve bush 19, so that there is no connection between the third valve pocket 30 and the fourth valve pocket 33.

The second piston 37 is designed to be cup-shaped and forms an interior space 38 as well as an inner pressure surface 39, which extends in the radial direction r (and, therefore, transversely to the longitudinal direction L). The spring element 21 generates a preload force, which acts in the first direction x1 on the pressure surface 39 of the second piston 37. The fourth valve pocket 33 is connected to the interior space 38 of the second piston 37 via the axial bore hole 24.

In the control position of the valve slide 20 represented in FIG. 3, the valve slide 20 is preloaded by the spring element 21. In the control position, the first piston 36 releases a connection between the second valve pocket 27 and the third valve pocket 30 via a leading edge 40 of the first piston 36. As a result, the second port 28 (inlet) is connected to the third port 31 (outlet) as well as to the fourth port 41 (outlet). Oil, which is fed to the second port 28, can therefore, on the one hand, exit the volumetric flow rate control valve 18 again, via the third port, and be directed across an orifice 44. The pressure of oil that flows through the orifice 44 is reduced in the orifice 44 due to the reduced diameter there, wherein a constant flow emerges from the orifice 44 and can be fed downstream to the torus 9.

The valve slide 20 is displaceable within the valve body 19 in the first axial direction x1 with the aid of the spring force of the spring element 21. In the opposite direction, the valve slide 20 is displaceable within the valve body 19 in the second axial direction x2 with the aid of a hydraulic compressive force. On the first face end S1, the valve slide 20 forms, for this purpose, a hydraulically effective end face 43, for example, a circular surface or an annular surface. The first valve pocket 23 is connected to the second port 27 (inlet) via the first port 25 (inlet), the connection line 42, the fourth port 41 (outlet), the third valve pocket 30, the axial bore hole 24, and the second valve pocket 27. Oil that is fed to the second valve pocket 27 can therefore also be fed to the first valve pocket 23 and to the axial bore hole 24, fill these cavities 23 and 24, and exert a hydraulic compressive force, opposed to the spring force, in the second axial direction x2 onto the hydraulically effective end face 43. If the hydraulic compressive force exceeds the spring force, the valve slide 20 can move in the second axial direction x2 and close the second valve pocket 27 or reduce a degree of opening for the second valve pocket 27. Oil fed to the second port 28 can then no longer—or only to a lesser extent—be fed via the volumetric flow rate control valve 18 to the orifice 44 and to the torus 9, because the first piston 36 closes the second valve pocket 27 completely or at least more narrowly. In addition, the first valve pocket 23 and the axial bore hole 24 are also no longer supplied with oil, or are supplied with less oil, and so the above-described hydraulic compressive force, which acts on the hydraulically effective surface 43, drops. Therefore, the valve slide 20 moves in the first axial direction x1 again due to the restoring force of the spring element 21, so that the valve slide 20 opens the second valve pocket 27 again and oil can flow again via the volumetric flow rate control valve 18 to the orifice 44 and to the torus 9 as well as to the hydraulically effective surface 43.

Figure 4:
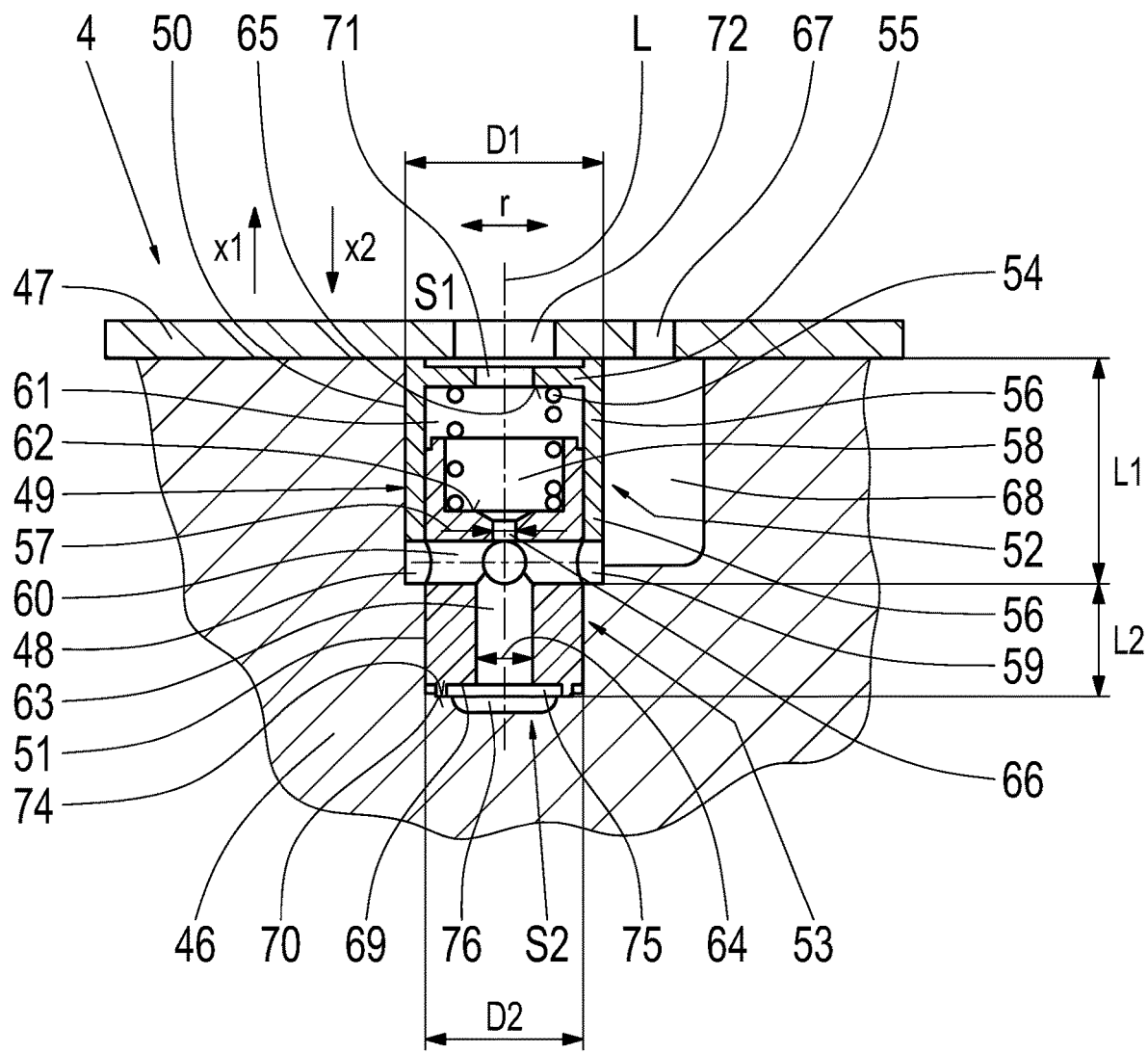
FIG. 4 shows a further volumetric flow rate control valve, which, according to example aspects of the invention, replaces the torus orifice in the hydraulic control unit according to FIG. 2, wherein the volumetric flow rate control valve is designed as a part to be inserted into a duct plate of the hydraulic control unit (feeding and discharge of oil from above) and generates a constant flow with the aid of an internal orifice.

FIG. 4 shows a portion of a housing 45 of the hydraulic control unit 4. The housing 45 includes a housing part, specifically, in the exemplary embodiment shown, a duct plate 46, and an intermediate plate 47, which can separate the top side of the duct plate 46 from a further housing part, for example, from a valve plate. The duct plate 46 includes a recess 48, into which a volumetric flow rate control valve 49 has been inserted, according to FIG. 4.

The recess 48 can be a bore hole. In the exemplary embodiment shown, the recess 48 is a stepped bore. The stepped bore 48 includes a first bore step 50 having a first bore diameter D1 in a radial direction r of the volumetric flow rate control valve 49 and having a first bore length L1 in an axial direction L of the volumetric flow rate control valve 49. In addition, the stepped bore 48 includes a second bore step 51 having a second bore diameter D2 in the radial direction r of the volumetric flow rate control valve 49 and having a second bore length L2 in the axial direction L of the volumetric flow rate control valve 49. The first bore diameter D1 is greater than the second bore diameter D2. The first bore length L1 is longer than the second bore length L2.

The volumetric flow rate control valve 49 includes a valve bush 52 and a valve slide 53, which is guided in the longitudinal direction L within the valve bush 52 and within the second bore step 51. In addition, the volumetric flow rate control valve 49 includes a restoring element in the form of a spring 54, and a valve cover 55. The valve bush 52 can be made, for example, of aluminum or plastic. The valve bush 52 can be, for example, a turned part. The valve cover 55 is fixedly connected to the valve bush 52, specifically, integrally in the exemplary embodiment shown. The valve bush 52 and the valve cover 55 can also both be made of plastic and bonded to each other or connected to each other with the aid of friction welding.

The valve slide 53 can be displaced back and forth in opposite axial directions x1 (first direction) and x2 (second direction) within the valve bush 52 and within the second bore step 51 along the longitudinal axis L of the volumetric flow rate control valve 49. The outer diameter of the valve slide 53 and the inner diameter of the valve bush 52 and/or the second bore diameter D2 of the second bore step 51 are appropriately matched to each other in this regard. The valve slide 53 can be preloaded with the aid of the spring 54 in a control position shown in FIG. 4 when the volumetric flow rate control valve 49 is mounted in the duct plate 46. The spring 54 is arranged in the area of a first face end S1 (top, when the hydraulic control unit 4 is installed in the automatic transmission 3 according to FIG. 1) of the volumetric flow rate control valve 49. The first end face S1 faces the intermediate plate 47.

The valve bush 52 includes a valve collar 56 having an outer diameter in the radial direction r of the volumetric flow rate control valve 49 and having a collar length in the axial direction L of the volumetric flow rate control valve 9. The outer diameter of the valve collar 56 of the valve bush 52 is designed to match the first bore diameter D1 of the first bore step 50 of the duct plate 46 (for example, the same size or slightly smaller). In this way, if the intermediate plate 47 is not yet located on the duct plate 46, the first valve collar 56 can be inserted into the first bore step 50 easily and true to size. The outer diameter of the valve slide 53 is also designed to match the second bore diameter D2 of the second bore step 51 of the duct plate 46 (for example, the same size or slightly smaller). In this way, if the intermediate plate 47 is not yet located on the duct plate 46, the valve slide 53 can be inserted into the second bore step 51 easily and true to size. The assembly can be carried out, for example, as follows: Initially, the valve slide 53 is inserted into the second bore step 51. The spring can have already been inserted as well or, alternatively, can be inserted in a subsequent assembly step. Thereafter, the valve bush 52 is pushed, over the spring 54 and the valve slide 53, into the first bore step 50. In addition, the valve slide 53, the spring 54, and the valve bush 52 can also initially be combined and then placed or inserted, as a unit (=volumetric flow rate control valve 49), into the stepped bore 48. Thereafter, the intermediate plate 47 can be mounted onto the duct plate 46 and the volumetric flow rate control valve 49 placed therein.

A radial bore hole 59 extends through the valve collar 56. In the exemplary embodiment according to FIG. 4, the bore hole 59 is a through hole. The radial through hole 59 can be utilized as an inlet of the volumetric flow rate control valve 49 for hydraulic fluid, in particular oil (the bore hole 59 is therefore referred to, in part, as an inlet in the following). The valve slide 53 also includes a radial through hole 60, which, in the exemplary embodiment according to FIG. 2, has the same diameter as the through hole 59 in the valve collar 56. In the position of the valve slide 53 shown in FIG. 4, the radial through hole 60 of the valve slide 53 aligns with the radial through hole 59 of the valve collar 56, and so a connection exists between the two radial through holes 59, 60, which is as great as possible. In the exemplary embodiment according to FIG. 4, the radial through hole 60 of the valve slide 53 connects opposite sections of the outer surface of the valve slide 53 to each other.

The feature "connected" or "connection" is understood to mean, in particular, that the particular interconnected elements are connected to each other in a hydraulically conductive manner, i.e., a hydraulic fluid, in particular oil, can flow from the one element to the other element and, if necessary, vice versa. The feature "disconnected" or "not connected to each other" can be understood to mean, in particular, that the particular elements that are disconnected from each other are not connected to each other in a hydraulically conductive manner, i.e., no hydraulic fluid, in particular oil, can flow from the one element to the other element and, if necessary, vice versa.

The valve slide 53 also includes an axial through hole 63. The axial through hole 63 extends coaxially about the longitudinal axis L of the valve slide 53. The axial through hole 63 has a first bore diameter 64 in the area of a second end face S2 (bottom, when the hydraulic control unit 4 has been installed in the automatic transmission 3 according to FIG. 1), which is located on a side of the volumetric flow rate control valve 49 opposite the first end face S1. The axial through hole 63 crosses the radial through hole 60, so that a hydraulic connection exists between the axial through hole 61 and the radial through hole 60.

After the crossing of the radial through hole 60, the axial through hole 63 forms, in a further extension of the axial through hole 63 in the first axial direction x1, an orifice 66. In the area of the orifice 66, the axial through hole 63 has a second diameter 57. The second diameter 57 of the axial through hole 63 is smaller than the first diameter 64. Hydraulic fluid, which flows via the inlet 59 into the radial through hole 60, can fill the radial through hole 60 and the axial through hole 63 and build up a hydraulic pressure in the aforementioned cavities 60, 63. The hydraulic fluid can then flow through the orifice 66. The pressure of hydraulic fluid is reduced in the orifice 66 due to the reduced diameter there, wherein a constant flow exits the orifice 66.

In the exemplary embodiment according to FIG. 4, the intermediate plate 47 includes a first through hole 67. The duct plate 46 includes a feed duct 28 for hydraulic fluid to the inlet 59 of the volumetric flow rate control valve 49. In the installed condition, the first through hole 67 of the intermediate plate 47 is connected to the feed duct 68 of the duct plate 46, and the feed duct 68 of the duct plate 46 is connected to the inlet 59 of the volumetric flow rate control valve 49. Hydraulic fluid is feedable to the inlet 59 of the volumetric flow rate control valve 49 via these line sections 67 and 68. For example, hydraulic fluid from the outlet of the converter clutch valve 12 (FIG. 2), or directly from the primary system pressure circuit 11 or directly from the secondary system pressure circuit can be fed to the first through hole 67. In the exemplary embodiment according to FIG. 4, the feed duct 68 extends in parallel to the longitudinal axis L of the volumetric flow rate control valve 49. At the axial end of the feed duct 68 in the second axial direction x2, the feed duct 68 is connected, in the radial direction r, to the inlet 59, which is arranged laterally on the volumetric flow rate control valve 9.

The valve cover 55 is arranged on the first end face S1 of the volumetric flow rate control valve 49. The valve cover 55 includes an opening 71, which is utilized as an outlet for hydraulic fluid. The intermediate plate 47 includes a second through hole 72. In the installed state, the opening 71 of the valve cover 55 of the volumetric flow rate control valve 49 is connected to the second through hole 72 of the intermediate plate 47. The pressure of hydraulic fluid fed to the inlet 59 of the volumetric flow rate control valve 49 via the first through hole 67 and the feed duct 68 can be reduced within the volumetric flow rate control valve 49 with the aid of the orifice 66, so that a constant flow of the hydraulic fluid exits the volumetric flow rate control valve 49 via the outlet 71 and is discharged via the second through hole 72 of the intermediate plate 47 and can be fed to the torus 9. On the opposite, second end face S2 of the volumetric flow rate control valve 49, the axial through hole 63 is closed by the duct plate 46 if the volumetric flow rate control valve 49 has been inserted into the stepped bore 48 (FIG. 4). In this regard, the second bore step 11 is designed as a blind hole. Therefore, no hydraulic fluid exits the volumetric flow rate control valve 49 on the second end face S2.

When the valve slide 53 is located in the control position shown in FIG. 4, hydraulic fluid can enter the radial through hole 60 via the inlet 59. The hydraulic fluid can fill the entire radial through hole 60 and the entire axial through hole 63, so that a pressure builds up in front of the orifice 66. Thereafter, the pressure of the hydraulic fluid is reduced in the orifice 66 due to the reduced diameter 57 there, so that a constant flow exits the orifice 66 in the direction of the first end face S1.

The constant flow of hydraulic fluid, coming out of the orifice 66, flows in the first axial direction x1 into a recess 58 of the valve slide 53. This recess 58 connects the valve slide 53 in the axial direction L to an interior space 61 of the valve bush 52. The recess 58 can be designed, for example, as an axial bore. The interior space 61 of the valve bush 52 is connected to the opening 71 of the valve cover 55 and to the second through hole 72 of the intermediate plate 47. Therefore, the constant flow of hydraulic fluid coming out of the orifice 66 can be discharged from the volumetric flow rate control valve 49 via the recess 58, the interior space 61, the opening 71 in the valve cover 55, and via the second through hole 32 in the intermediate plate 47, and can be fed downstream to the torus 9.

The spring 54 is accommodated in the recess 58, which forms a pressure surface 62. A first end of the spring 54 rests against a pressure surface 65 of the valve cover 55. The other end of the spring 54 rests against the pressure surface 62 of the valve slide 53. The pressure surface 62 of the valve slide 53 extends perpendicularly to the longitudinal direction L and extends in the radial direction r. The spring 54 is preloaded. The spring 54 exerts a restoring force onto the pressure surface 62 of the valve slide 53 and onto the pressure surface 65 of the valve cover 55. The restoring force acts in the axial second direction x2 onto the valve slide 53, so that the valve slide 53 tends to move into the control position (end-stop position) represented in FIG. 4.

A displacement force, which acts on the valve slide 53 in the first axial direction x1, can be induced by hydraulic fluid that is fed to the volumetric flow rate control valve 49 via the inlet 59 as described above. The valve slide 53 forms, radially inward, in the area of the second end face S2, a hydraulically effective annular surface 69 and, radially farther outward, a stop surface 70.

The stop surface 70 is also annular in the exemplary embodiment shown. The annular surface 69 and the stop surface 70 of the valve slide 53 extend perpendicularly to the longitudinal direction L and extend in the radial direction r. The stop surface 70 is arranged at a distance from the annular surface 69 in the axial second direction x2 and forms an end-face termination of the valve slide 53. According to FIG. 4, the duct plate 46 forms, in the area of the second end face S2 of the volumetric flow rate control valve 49, a stop 74 for the stop surface 70 of the valve slide 53 in the axial second direction x2. The spring 54 presses the valve slide 53, via the stop surface 70, against the stop 74 of the duct plate 46. The stop 74 is positioned in such a way that an annular gap 75 is always implemented between the annular surface 69 of the valve slide 53 and an opposite back pressure surface of the duct plate 46. As a result, the hydraulic fluid can always act upon the complete annular surface 69.

Hydraulic fluid is flowable via the inlet 59, via the radial through hole 60, via the axial through hole 63, and via a passage 76 formed by the duct plate 46 to the annular surface 69 and exert pressure onto the annular surface 69. A displacement force corresponding to this pressure counteracts the restoring force of the spring 54 in the axial first direction x1. If the displacement force increases, the valve slide 53 tends to move in the axial first direction x1, counter to the restoring force of the spring 54. If the pressure of the hydraulic fluid on the annular surface 69 exceeds a limiting value, the valve slide 53 closes the inlet 59, so that no more hydraulic fluid enters the interior of the volumetric flow rate control valve 49. Thereafter, the displacement force will drop again, so that the valve slide 53 is moved, with the aid of the restoring force of the spring 54, in the axial direction x2 again, the valve slide 53 releases the inlet 59 again, and a pressure and/or a displacement force can build up again on the annular surface 69.

The spring 54 rests, in the axial direction L, against the valve slide 53, on the one side and, on the other side, against the valve cover 55. The spring 54 is preloaded and exerts the above-described restoring force onto the valve slide 53, whereby the valve slide, in the position shown in FIG. 4, is pressed against the stop 74. Due to the preload, the spring 54 continues to press the valve cover 55, which is fixedly connected to the valve bush 52, against the intermediate plate 47. In this way, the valve cover 55 is sealed with respect to the intermediate plate 47 with the aid of the spring 54 if the volumetric flow rate control valve 49 has been inserted into the duct plate 46 and is closed in the longitudinal direction L by the intermediate plate 47.

When the hydraulic fluid exerts the above-described displacement force onto the annular surface 69 of the valve slide 53, the valve slide 53 can lift up off the stop 74 of the duct plate 46 counter to the restoring force of the spring 54. In this way, the valve cover 55 is sealed with respect to the intermediate plate 47, during operation, by the pressurized hydraulic fluid if the volumetric flow rate control valve 49 has been inserted into the duct plate 46 and is closed in the longitudinal direction L by the intermediate plate 47.

Figure 5:
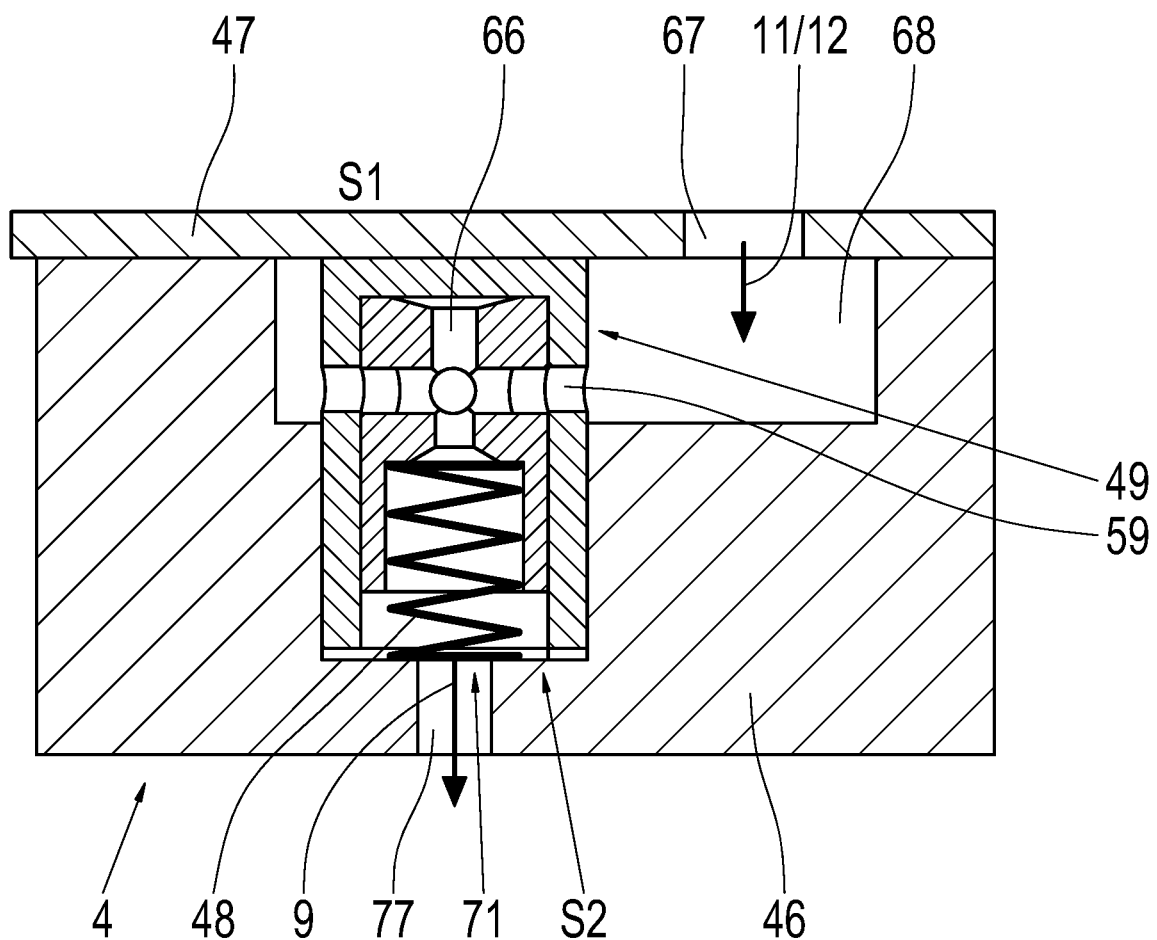
FIG. 5 shows a further volumetric flow rate control valve, which, according to example aspects of the invention, replaces the torus orifice in the hydraulic control unit according to FIG. 2, wherein the volumetric flow rate control valve is designed as a part to be inserted into a duct plate of the hydraulic control unit (oil feed from above, oil discharge downward) and generates a constant flow at an internal orifice.

FIG. 5 shows a further volumetric flow rate control valve 49, which, as an insert part, has been inserted in the duct plate 46 of the hydraulic control unit 4 and is held there by the intermediate plate 47. In contrast to the exemplary embodiment according to FIG. 4, the volumetric flow rate control valve 49 has been inserted into the recess 48 of the duct plate 46, turned by one hundred and eighty degrees (180°). The spring 48 rests against the duct plate 46 in the area of the second face end S2 (bottom) and, in the area of the first face end S1 (top), presses the valve slide 53 according to FIG. 5 against the closed base of the valve bush 52, which, as a result, is pressed against the intermediate plate 47. Oil—in particular coming from the outlet of the converter clutch valve 12, directly from the primary system pressure circuit 11 or directly from the secondary system pressure circuit—is flowable through the opening 67 in the intermediate plate 47 into the feed duct 68 and can be fed to the inlet 59 of the volumetric flow rate control valve 49. Within the volumetric flow rate control valve 49, the oil can flow across the orifice 66 and, there, undergo a reduction in pressure, so that a constant flow of oil can emerge, downward, from the volumetric flow rate control valve 49 and, in fact, on the face end S2 of the volumetric flow rate control valve 49 facing away from the intermediate plate 47. Oil that exits the volumetric flow rate control valve 48 via its outlet 71, which is located in the area of the lower second face end S2, can be fed to the torus 9 via a discharge duct 77, which is formed by the duct plate 46.

Figure 6:
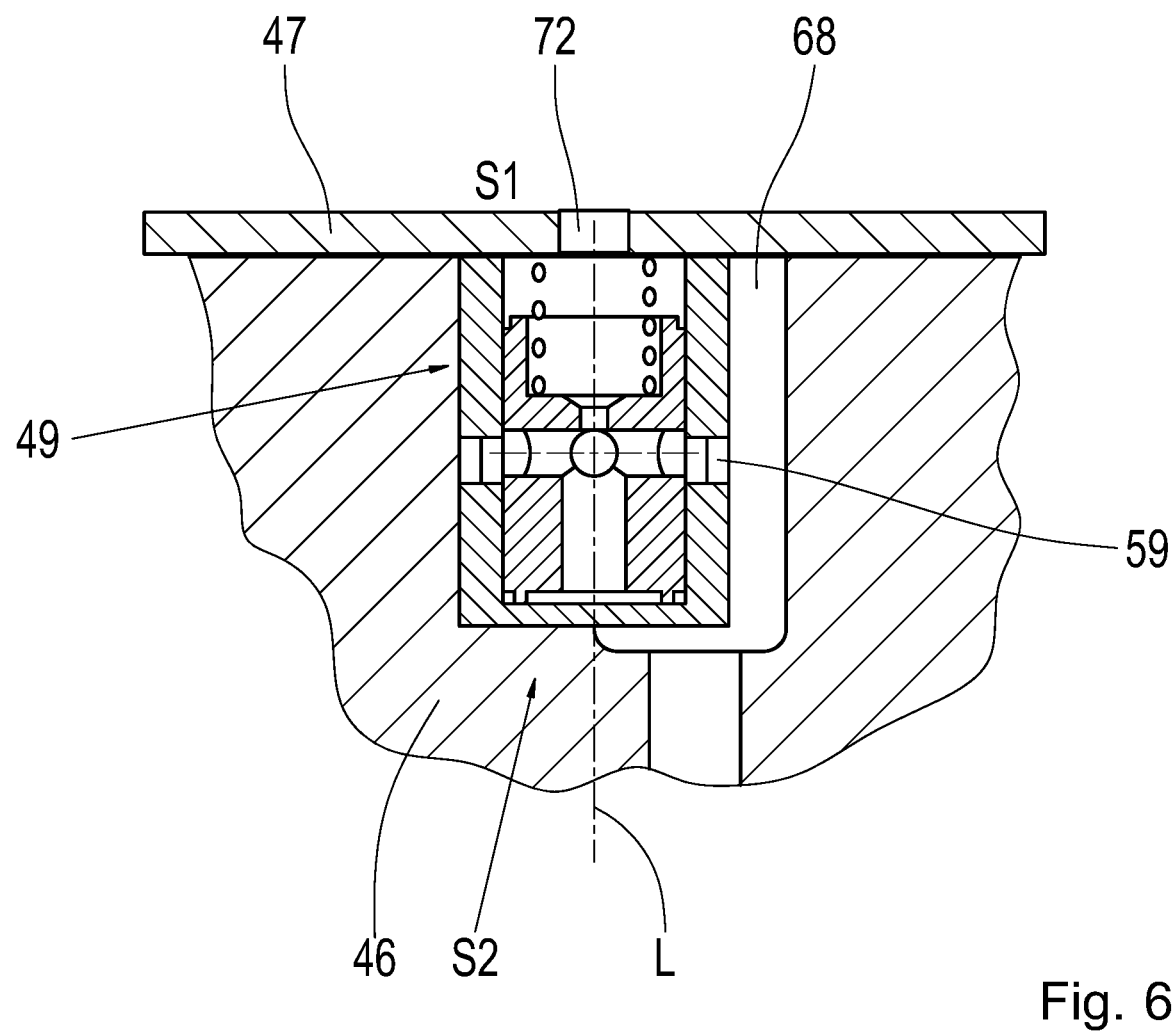
FIG. 6 shows a further volumetric flow rate control valve, which, according to example aspects of the invention, replaces the torus orifice in the hydraulic control unit according to FIG. 2, wherein the volumetric flow rate control valve is designed as a part to be inserted into a duct plate of the hydraulic control unit (oil feed from below and oil discharge upward) and generates a constant flow at an internal orifice.

The volumetric flow rate control valve according to FIG. 6 is installed the same as in the exemplary embodiment according to FIG. 4. The discharge of oil can take place upward, as in the exemplary embodiment according to FIG. 4, via a through hole 72 of the intermediate plate 47. The feeding of oil does not take place via the intermediate plate 47 as in the exemplary embodiment according to FIG. 4. Rather, the feeding takes place from "below", i.e., the feed duct 68 approaches the volumetric flow rate control valve 49 from the second face end S2 and supplies the volumetric flow rate control valve 49, as shown in FIG. 4, from the side. This creates a further degree of freedom.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS

L axial direction of volumetric flow rate control valve
pvs pilot pressure for converter clutch valve
S1 first face end of volumetric flow rate control valve
S2 second face end of volumetric flow rate control valve
x1 first axial direction
x2 second axial direction
r radial direction of volumetric flow rate control valve
T tank
1 motor vehicle
2 prime mover
3 automatic transmission
4 hydraulic control unit
5 hydrodynamic torque converter
6 impeller
7 turbine wheel
8 stator
9 torus
10 torque converter lock-up clutch
11 primary system pressure circuit
12 converter clutch valve
13 oil line to the torque converter lock-up clutch
14 orifice
15 oil line "to the torus"
16 low-end valve
17 oil line "from the torus"
18 volumetric flow rate control valve
19 valve housing
20 valve slide
21 spring element
22 first valve collar
23 first valve pocket
24 axial bore hole of valve housing
25 first port (inlet)
26 second valve collar
27 second valve pocket
28 second port (inlet)
29 third valve collar
30 third valve pocket
31 third port (outlet)
32 fourth valve collar
33 fourth valve pocket
34 fifth port (outlet)
35 piston rod
36 first piston
37 second piston
38 interior space
39 pressure surface
40 leading edge
41 fourth port
42 connection line
43 effective end face
44 orifice
45 housing
46 duct plate
47 intermediate plate
48 stepped bore
49 volumetric flow rate control valve
50 first bore step
51 second bore step
52 valve bush
53 valve slide
54 spring
55 valve cover
56 first valve collar
57 diameter of orifice
58 recess
59 radial through hole/inlet of valve bush
60 radial through hole of valve slide
61 interior space in valve bush 62 pressure surface of valve slide
63 axial through hole of valve slide
64 larger bore diameter of axial through hole
65 pressure surface of valve cover
66 orifice
67 first through hole of intermediate plate
68 feed duct
69 annular surface
70 stop surface
71 opening in valve cover
72 second through hole of intermediate plate
73 outer step of radial through hole
74 stop
75 annular gap
76 passage
77 discharge duct

The invention claimed is:

1. A hydraulic control unit (4) for an automatic transmission (3) of a motor vehicle (1), the hydraulic control unit (4) comprising a volumetric flow rate control valve (18, 49) and a secondary system pressure circuit, wherein:
the hydraulic control unit (4) is configured for feeding hydraulic fluid to an inlet (28, 59) of the volumetric flow rate control valve (18, 49);
an outlet (31, 71) of the volumetric flow rate control valve (18, 49) is connected to a torque converter torus (9) of the automatic transmission (3);
the volumetric flow rate control valve (28, 59) is configured for directing the hydraulic fluid across an orifice (44, 66) so that a pressure of the hydraulic fluid is reduced and a constant flow of the hydraulic fluid is feedable to the torque converter torus (9); and
the hydraulic control unit (4) is configured for feeding the hydraulic fluid from the secondary system pressure circuit to the inlet (28, 59) of the volumetric flow rate control valve (18, 49).

2. The hydraulic control unit (4) of claim 1, wherein the orifice (44) is arranged downstream from the outlet (31) of the volumetric flow rate control valve (18).

3. The hydraulic control unit (4) of claim 1, wherein the orifice (66) is arranged within the volumetric flow rate control valve (49).

4. The hydraulic control unit (4) of claim 3, further comprising a housing part (46) with a recess (48), wherein the volumetric flow rate control valve (49) is arranged in the recess (48).

5. The hydraulic control unit (4) of claim 4, further comprising an intermediate plate (47) above a face end (S1) of the volumetric flow rate control valve (49), wherein:
the intermediate plate (47) and the housing part (46) form a feed duct (67, 68), via which the hydraulic fluid is feedable to the inlet (59) of the volumetric flow rate control valve (49); and
the intermediate plate (47) comprises an opening (72) via which hydraulic fluid is dischargeable from the volumetric flow rate control valve (49).

6. The hydraulic control unit (4) of claim 4, further comprising an intermediate plate (47) above a face end (S1) of the volumetric flow rate control valve (49), wherein:
the intermediate plate (47) and the housing part (46) form a feed duct (67, 68), via which hydraulic fluid is feedable to the inlet (59) of the volumetric flow rate control valve (49); and
the housing part (46) forms a discharge duct (77) via which the hydraulic fluid is dischargeable downward out of the outlet (71) of the volumetric flow rate control valve (49).

7. The hydraulic control unit (4) of claim 4, further comprising an intermediate plate (47) above a face end (S1) of the volumetric flow rate control valve (49), wherein:
the housing part (46) forms a feed duct (68) via which the hydraulic fluid is feedable from below the volumetric flow rate control valve (49) to the inlet (59) of the volumetric flow rate control valve (49); and
the hydraulic fluid is dischargeable from the volumetric flow rate control valve (49) via the intermediate plate (47).

8. The hydraulic control unit (4) of claim 1, further comprising a primary system pressure circuit (11) and a converter clutch valve (12), wherein:
an inlet of the converter clutch valve (12) is connected to the primary system pressure circuit (11); and
an outlet of the converter clutch valve (12) is connected to the inlet (28, 59) of the volumetric flow rate control valve (18, 49) such that the hydraulic fluid from the primary system pressure circuit (11) is feedable to the volumetric flow rate control valve (18, 49) via the converter clutch valve (12).

9. The hydraulic control unit (4) of claim 1, further comprising a primary system pressure circuit (11), wherein the hydraulic control unit (4) is configured for feeding the hydraulic fluid from the primary system pressure circuit (11) to the inlet (28, 59) of the volumetric flow rate control valve (18, 49).

10. An automatic transmission (3) comprising the hydraulic control unit (4) of claim 1.

11. A motor vehicle (1) comprising the automatic transmission (3) of claim 10.

12. A hydraulic control unit (4) for an automatic transmission (3) of a motor vehicle (1), the hydraulic control unit (4) comprising a volumetric flow rate control valve (18, 49), a housing part (46), and an intermediate plate (47), wherein:
the hydraulic control unit (4) is configured for feeding hydraulic fluid to an inlet (28, 59) of the volumetric flow rate control valve (18, 49);
an outlet (31, 71) of the volumetric flow rate control valve (18, 49) is connected to a torque converter torus (9) of the automatic transmission (3);
the volumetric flow rate control valve (28, 59) is configured for directing the hydraulic fluid across an orifice (44, 66) so that a pressure of the hydraulic fluid is reduced and a constant flow of the hydraulic fluid is feedable to the torque converter torus (9), the orifice (66) arranged within the volumetric flow rate control valve (49);
the volumetric flow rate control valve (49) is arranged in a recess (48) of the housing part (46);
an intermediate plate (47) is arranged above a face end (S1) of the volumetric flow rate control valve (49);
the intermediate plate (47) and the housing part (46) form a feed duct (67, 68), via which the hydraulic fluid is feedable to the inlet (59) of the volumetric flow rate control valve (49); and
the hydraulic fluid is dischargeable from the volumetric flow rate control valve (49) via the intermediate plate (47).

13. A hydraulic control unit (4) for an automatic transmission (3) of a motor vehicle (1), the hydraulic control unit (4) comprising a volumetric flow rate control valve (18, 49), a primary system pressure circuit (11), and a converter clutch valve (12), wherein:
the hydraulic control unit (4) is configured for feeding hydraulic fluid to an inlet (28, 59) of the volumetric flow rate control valve (18, 49);

an outlet (31, 71) of the volumetric flow rate control valve (18, 49) is connected to a torque converter torus (9) of the automatic transmission (3);

the volumetric flow rate control valve (28, 59) is configured for directing the hydraulic fluid across an orifice (44, 66) so that a pressure of the hydraulic fluid is reduced and a constant flow of the hydraulic fluid is feedable to the torque converter torus (9);

an inlet of the converter clutch valve (12) is connected to the primary system pressure circuit (11); and an outlet of the converter clutch valve (12) is connected to the inlet (28, 59) of the volumetric flow rate control valve (18, 49) such that the hydraulic fluid from the primary system pressure circuit (11) is feedable to the volumetric flow rate control valve (18, 49) via the converter clutch valve (12).

\* \* \* \* \*